Patented May 30, 1944

2,349,827

UNITED STATES PATENT OFFICE 2,349,827

CATALYTIC REFORMING

William J. Mattox, Chicago, Ill., assignor to Universal Oil Products Company, Chicago, Ill., a corporation of Delaware No Drawing. Application April 19, 1941,
Serial No. 389,449

9 Claims. (Cl. 196—50)

This invention relates to a process for reforming naphthas and other gasoline fractions, particularly those relatively high in olefins such as may be formed by a thermal cracking process. More particularly, this invention is related to the use of certain catalysts which have been shown to be particularly effective in increasing the octane number of the aforesaid charging stocks with a minimum of side reactions leading to the formation of normally gaseous products.

The catalysts of my invention comprise the phosphates of such elements as aluminum and magnesium which have a sufficiently high melting point and low volatility to withstand the temperatures to which they are subjected during the conversion and regeneration steps of the process. The reforming of olefinic gasolines is associated with deposition of carbonaceous material and it is a requisite of the catalysts used that they be stable not only at the temperatures required for the conversion process but also at the temperatures and other conditions to which a contact mass is subjected during the regeneration step. The common method used in regenerating the catalyst which has been used for conversions in which carbonaceous material is deposited on the catalyst, is to remove said carbonaceous material by oxidizing it with gases containing a controlled quantity of oxygen. The temperature used during this regeneration process is at least equal to that used in the conversion step and in some cases, somewhat higher in order to permit regeneration in a minimum of time.

The phosphates of certain metals which readily undergo change in valence when subjected to alternate oxidizing and reducing atmospheres, are not suitable in the process of catalytic reforming of olefinic hydrocarbons, particularly those of such elements as, for example, nickel, iron, and cobalt which promote side reactions and which cause a formation of carbonaceous deposits as well as light gaseous hydrocarbons. Most of the elements in the right hand column of group II of the Periodic Table form phosphates which are effective in the catalytic reforming of olefinic hydrocarbons, those of beryllium, magnesium, zinc, and cadmium being comprised in my invention although they are not to be considered as equally effective and it is not my intention to place them on an equivalent basis. The phosphates of mercury are not satisfactory owing in part to their instability during regeneration and conversions. The metals of group III (particularly those of lower atomic weight) form phosphates which are in general satisfactory catalysts, aluminum phosphate being particularly effective, while those of the elements which form strong bases such as those of sodium and the other alkali metals as well as those of the alkaline earth metals do not show the desired catalytic activity.

In one specific embodiment, the present invention comprises a process for the reforming of olefinic gasolines by subjecting them, at elevated temperatures of the order of 800–1100° F. and at pressures ranging from atmospheric to moderately superatmospheric and for times of contact which correspond to the space velocity of 3 to 90 volumes of liquid charging stock per hour per unit volume of catalyst when operating at a temperature of 950° F., to contact with a catalyst which comprises as one of its essential constituents the phosphate of a metal which has a constant valence during the conversion and regeneration cycle of the process, said metal being further characterized in that it forms a hydroxide which is a weak base.

The preferred pressure in the present invention is one which is sufficiently superatmospheric so as to force the charging stock through the catalyst bed and into the separating system without the use of vacuum apparatus. As the pressure is increased, the amount of polymerization as well as carbon formation is considerably increased. At the higher temperatures, pressures as much as 100 pounds per square inch may be used although pressures of five pounds to 15 pounds per square inch gauge are preferable. The space velocity used depends upon the temperature and as the temperature drops below 900° F. the space velocity decreases to the point where the quantity of catalyst required becomes quite large and the process becomes less attractive when considered from the commercial viewpoint. A space velocity as high as 90 to 100 volumes of liquid charging stock per hour per unit volume of catalyst may be used when operating at a temperature above 1000° F. As increasingly high temperatures are used, the amount of gas formation increases and at temperatures above 1100° F., the liquid volume loss associated with the definite increase in octane number becomes undesirably high and is not compensated by the decreased size of the reactor necessary at such a temperature.

In practicing the process of my invention, the catalyst prepared according to the methods herein described, is used as a filler in the reaction tube or chamber in the form of particles of graded size or small pellets and the gasoline fraction heated to a temperature within the range of 800–1100° F. is passed through said catalyst at the space velocities hereinbefore set forth. Owing to the relatively small amount of heat being absorbed or liberated in the reaction, adiabatic reactors are preferred because of their simplicity and reduced cost of construction. The reformed products are then quenched and subjected to a stabilizing operation in order to prepare a motor fuel of the desired volatility.

The reactions taking place in the reforming of olefinic gasolines by the catalysts comprised within the scope of my invention are not thoroughly understood. In the thermal cracking of higher boiling hydrocarbons to form gasoline, some of the double bonds present in the olefinic molecules are probably not in the most stable position and at the high temperature used in the reforming process, a shift in the position in these double bonds undoubtedly takes place. It is assumed that the double bonds are more centrally located as a result of the contact action and this may be, in part, responsible for the higher octane number. In addition to the shift in double bond, a certain amount of branching undoubtedly takes place resulting in the formation of iso-olefins from those of normal structure. The amount of cracking taking place in the reforming process promoted by the catalyst of this present invention is comparatively small. The amount of liquid volume loss associated with the reforming of a complete boiling range gasoline is usually less than 5 percent. The amount of polymerization when operating at pressures only mildly superatmospheric is so small that in some cases it would not be necessary to redistil the product to remove the heavy bottoms. In some cases, particularly when the pressure is increased to the upper limits of 50 to 100 pounds per square inch, the amount of polymer formed is sufficiently great that it may be advisable or necessary to redistil the product. It has also been observed in some cases that a catalyst not completely regenerated is more desirable than one that has been completely freed from carbonaceous deposits. In some cases it may also be desired to prefractionate the charging stock and process only the higher boiling portion. In this case the complete boiling range of gasoline may be fractionated into two fractions, the lower boiling portion and the higher boiling portion, the latter for example, having an initial boiling point of about 200° F. When operating with such a gasoline fraction it may in some cases be found desirable to increase the severity of operating conditions so as to promote a mild amount of cracking and the formation of light ends. All such variations in the operating conditions are comprised within the scope of my invention.

It has been found that composite catalysts of the phosphates of the hereinbefore mentioned elements with certain hydrous oxides, form highly effective catalysts. It has been noted in particular that the chemically precipitated and purified hydrous oxides or hydrogels of such elements as silicon, aluminum, zirconium, and thorium are particularly effective. It has also been found that not all the hydrous oxides are satisfactory in the formation of these composite catalysts. The hydrous oxides of such elements as vanadium, chromium, iron, and nickel and in general the hydrous oxides of those elements which undergo a valence change during the conversion and regeneration cycle of the process, are not considered satisfactory. The presence of compounds of the elements of variable valence results in the formation of effective quantities of carbon and normally gaseous products.

*Example I*

A thermally cracked gasoline having an octane number of 61.2 A. S. T. M. motor method and having been obtained by processing a Texas gas oil, was used as a charging stock in this example. The catalyst used was an alumina prepared by precipitating an aluminum hydroxide from a solution of aluminum sulfate by ammonium hydroxide. The precipitate was washed free from sulfate ions and then dried to constant weight at 400° C. The mass was then screened to separate particles of 10 to 30 mesh size. It was then heated to a temperature of 950° F. and used to process the aforesaid charging stock. When using a pressure of one atmosphere and a liquid hourly space velocity of 10, a 99.5 volume percent liquid recovery of gasoline having an octane number of 68.3 A. S. T. M. motor method was obtained. The amount of carbon deposited during the six hour process period was equal to .078 percent by weight of the charge. The amount of carbon deposited on the catalyst after the end of the six hour period was equal to 5.29 percent by weight of the catalyst.

*Example II*

The catalyst used in this example may be prepared by mixing a portion of the washed alumina hydrogel from the previous example with aluminum phosphate in such quantity as to form a product containing 25 percent aluminum phosphate by weight. After drying for six hours at 300° C. and then screening to separate particles of 10 to 30 mesh size, the catalyst may then be heated to a temperature of 950° F. and used to process the gasoline of the preceding example. Using an hourly space velocity of 10 and a pressure of one atmosphere, a 99.3 volume percent liquid recovery may be obtained with a product having an octane number of 69.2.

*Example III*

The catalyst used in this example had the empirical composition of 100 mols of $SiO_2$, two mols of $Al_2O_3$, and four mols of $ZrO_2$. It was prepared from the precipitated hydrogels, the material being washed free from alkali metal ions. The catalyst was used in the form of ⅛ by ⅛ inch cylindrical pill, 4 percent flour and 2 percent stearic acid being used in the pilling operation. This catalyst was used to process the Texas cracked gasoline used in Example I and II. Operating at a temperature of 950° F., a liquid hourly space velocity of 10 volumes of charge per volume of catalyst, a 99.1 volume percent yield of gasoline having an octane number of 68.3 was obtained. After a process period of six hours, the amount of carbon deposit on the catalyst was equal to 4.04 percent by weight which corresponds to .068 percent by weight of the charging stock.

*Example IV*

The catalyst used in this example may be prepared by incorporating a blend of the chemically precipitated and purified silica-alumina-zirconia composite used in the preceding example with aluminum phosphate, using proportions of 80 percent by weight of the aluminum-silica-zirconia composite and 20 percent by weight of aluminum phosphate. This composite is mixed in the undried condition and then dried and screened to separate particles of 10 to 30 mesh size. These particles are then heated to a temperature of 950° F. at which time they are ready for processing. Using a thermally cracked gasoline obtained by the thermal cracking of a Pennsylvania gas oil having an octane number of 66.0 and a bromine number of 84, a 95.6 volume per cent gasoline having an octane number of 75.3 A. S. T. M. motor method may be obtained.

*Example V*

The catalyst used in this example comprises a mixture of aluminum phosphate and aluminum fluoride, the aluminum fluoride was somewhat less than 30 percent by weight and the composite may be prepared by precipitating an aluminum phosphate gel from a solution of aluminum chloride in phosphoric acid by the addition of ammonium hydroxide, filtering and adding aluminum fluoride hydrate to the washed gel. Such a catalyst was used in processing a 61.2 octane number A. S. T. M. motor method gasoline obtained by the thermal cracking of a Texas charging stock, operating at a catalyst temperature of 950° F. and a liquid hourly space velocity of 10 volumes of charge per unit volume of catalyst. A 96.5 volume percent gasoline having an octane number of 71.1 was obtained. The amount of carbonaceous deposits during the run was equal to 0.093 percent by weight of the charging stock.

*Example VI*

When the thermally cracked gasoline used in Example IV is passed over pure aluminum phosphate at a temperature of 950° F. at a liquid hourly space velocity of 15 volumes of charge per unit volume of catalyst at a pressure of one atmosphere, 97.0 volume of said gasoline having an octane number of 73.5 A. S. T. M. motor method may be obtained.

*Example VII*

The catalyst used in this example may be prepared by acidifying a solution of sodium silicate to precipitate a silica hydrogel followed by washing with sufficient quantity of acid to remove the sodium ions. After removing the excess water, the moist silica gel is then mixed with a sufficient quantity of aluminum phosphate so as to form a mixture containing about 35 percent aluminum phosphate by weight. After drying, this mixture is then screened to separate particles of 10 to 30 mesh size. These particles are heated to a temperature of 950° F. and using the thermally cracked gasoline referred to in Example IV, a 96.5 volume percent gasoline having an octane number of 75.1 A. S. T. M. motor method may be obtained when operating under a pressure of one atmosphere.

I claim as my invention:

1. A process for the reforming of an olefinic gasoline which comprises subjecting said gasoline to contact with aluminum phosphate at a temperature within the approximate limits of 800 to 1100° F. and at a pressure within the approximate limits of atmospheric to about 100 pounds per square inch and for a time of contact adequate to substantially increase the octane number thereof.

2. A process for reforming an olefinic gasoline which comprises subjecting said gasoline to contact with a catalyst composite comprising magnesium pyrophosphate as an essential constituent at a temperature within the approximate limits of 800 to 1100° F. and at a pressure within the approximate limits of atmospheric to about 100 pounds per square inch and for a time of contact adequate to substantially increase the octane number thereof.

3. A process for reforming olefinic gasoline which comprises subjecting the gasoline in vapor phase at a temperature of about 800° F. to about 1100° F. under a pressure below 100 pounds per square inch and at a liquid hourly space velocity of about 3 to 100 to the action of a phosphate of a metal which has a constant valence during said conversion process and in regeneration treatment thereof, said metal being further characterized in that it forms a hydroxide which is a weak base.

4. A process for reforming olefinic gasoline which comprises subjecting the gasoline in vapor phase at a temperature of about 800° F. to about 1100° F. under a pressure below 100 pounds per square inch and at a liquid hourly space velocity of about 3 to 100 to the action of a catalyst comprising a calcined silica hydrogel and a phosphate of a metal which has a constant valence during said conversion process and in regeneration treatment thereof, said metal being further characterized in that it forms a hydroxide which is a weak base.

5. The process as defined in claim 4 further characterized in that said catalyst contains alumina.

6. The process as defined in claim 4 further characterized in that said catalyst contains zirconia.

7. The process as defined in claim 4 further characterized in that said catalyst contains alumina and zirconia.

8. The process as defined in claim 3 further characterized in that said metal is aluminum.

9. The process as defined in claim 3 further characterized in that said metal is magnesium.

WILLIAM J. MATTOX.